(12) United States Patent
Diaz

(10) Patent No.: US 7,513,478 B1
(45) Date of Patent: Apr. 7, 2009

(54) CONCEALED DECK PLATE EYELET ANCHOR APPARATUS

(76) Inventor: Carroll Diaz, 464 W. 47th St., Cutoff, LA (US) 70345

( * ) Notice: Subject to any disclaimer, the term of this patent is extended or adjusted under 35 U.S.C. 154(b) by 0 days.

(21) Appl. No.: 11/457,555

(22) Filed: Jul. 14, 2006

Related U.S. Application Data

(60) Provisional application No. 60/699,351, filed on Jul. 14, 2005.

(51) Int. Cl.
*A47B 97/00* (2006.01)
(52) U.S. Cl. .................... 248/500; 52/124.2
(58) Field of Classification Search ............... 248/499, 248/500, 505, 231.9; 52/124.2, 125.5, 702
See application file for complete search history.

(56) References Cited

U.S. PATENT DOCUMENTS 5,346,677 A * 9/1994 Risk .................. 422/297
5,602,719 A * 2/1997 Kinion .................. 361/704
2006/0048459 A1* 3/2006 Moore .................. 52/79.1
2007/0191148 A1* 8/2007 Shannon .................. 473/476

* cited by examiner

*Primary Examiner*—Ramon O Ramirez
(74) *Attorney, Agent, or Firm*—Garvey, Smith, Nehrbass & North, L.L.C.; Charles C. Garvey, Jr.; Seth M. Nehrbass

(57) ABSTRACT

An eyebolt anchor apparatus provides a fixture that is preferably mounted flush with the deck of a structure to which vehicles, equipment packages, aircraft or the like are to be supported and maintained in their position with tie down straps, such straps can span between the aircraft, vehicle or package and the anchor apparatus. The tie down straps are supported at the deck level with an anchor bolt that can be stored below deck in a fixture that is part of the anchor bolt apparatus. The fixture has a hatch that is movable between opened and closed positions. The eyebolt can be stored below deck in a hatch interior for storage or removed and installed above on the upper surface of the fixture when in use.

26 Claims, 7 Drawing Sheets

CONCEALED DECK PLATE EYELET ANCHOR APPARATUS

CROSS-REFERENCE TO RELATED APPLICATIONS

Priority of U.S. Provisional Patent Application Ser. No. 60/699,351, filed Jul. 14, 2005, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to devices for anchoring equipment or craft such as aircraft to a deck such as a heliport, offshore oil platform, metal deck or the like. An improved concealable eyelet is mounted within a container or fixture having a hatch that can be opened and closed, the hatch having plate sections that can be used to support a hidden anchor, such as an eyebolt and wherein the anchor (e.g. eyebolt) can be concealed below deck when the hatch is closed upon a supporting frame.

2. General Background of the Invention

There are many situations wherein a heavy item such as an aircraft, automobile, truck, vehicle, machine, or an equipment package containing a combination of mechanical devices must be anchored to a selected deck or like platform. For example, a helicopter must be anchored to its heliport by a plurality of tie down straps so that it is not damaged if high wind conditions occur.

Heavy items of equipment likewise must be anchored when placed in certain environments such as for example an open deck of an oil platform or production platform or factory decking. In many situations, exposed padeyes or other items known for the purpose of anchoring a tie down strap can be dangerous, the protruding structure being a hazard to individuals walking in the area.

BRIEF SUMMARY OF THE INVENTION

The present invention provides an improved concealable anchor apparatus that employs an anchor (e.g. eyebolt) mounted in a specially configured container or fixture that has a hatch that can be opened and closed. The hatch supports one or more plates to which the anchor (e.g. eyebolt) can be fastened during use. When the hatch is closed, the anchor or eyebolt is stored below a planar deck surface.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 13:
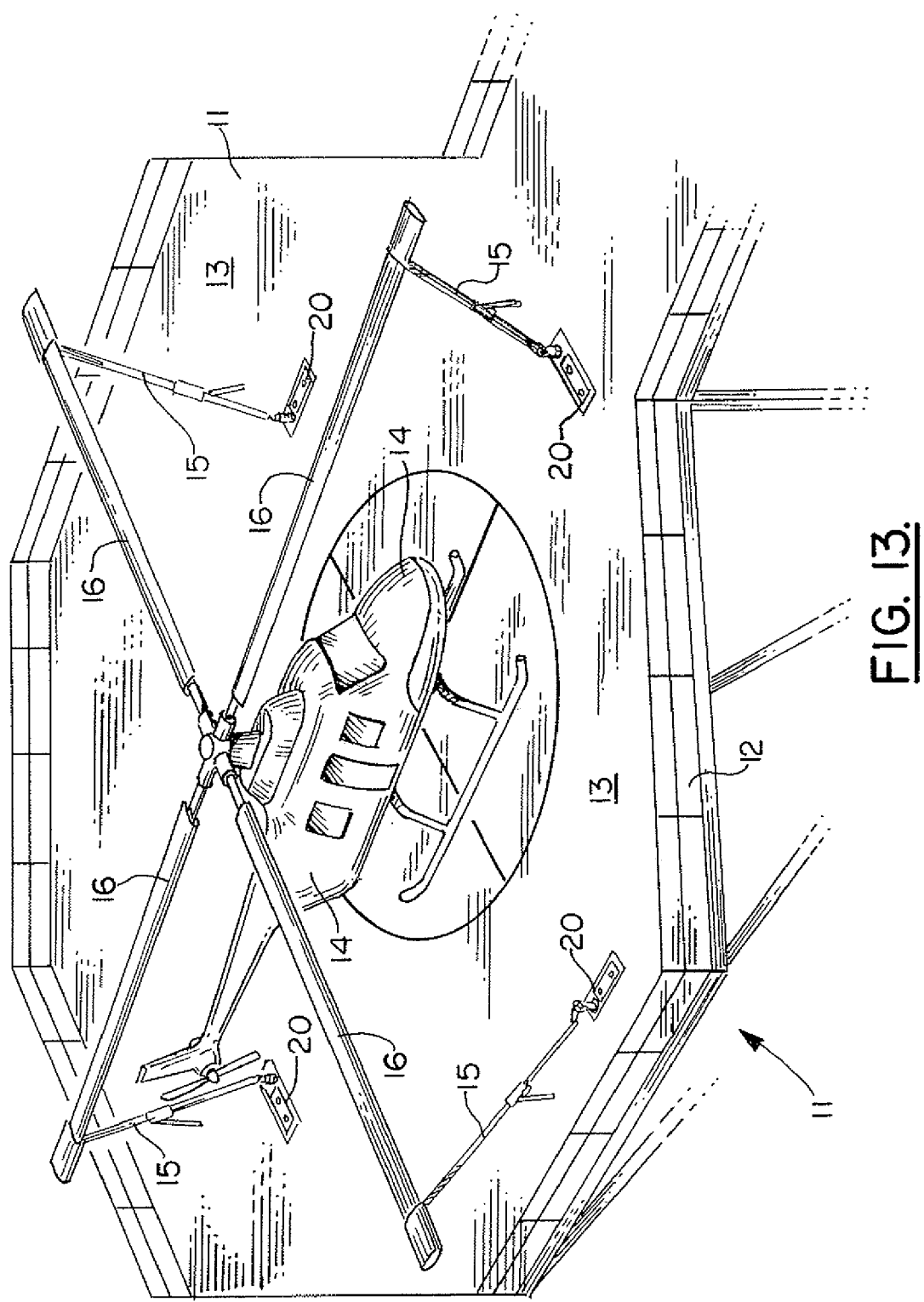
FIG. 13 is a perspective view of the preferred embodiment of the apparatus of the present invention.
Figure 14:
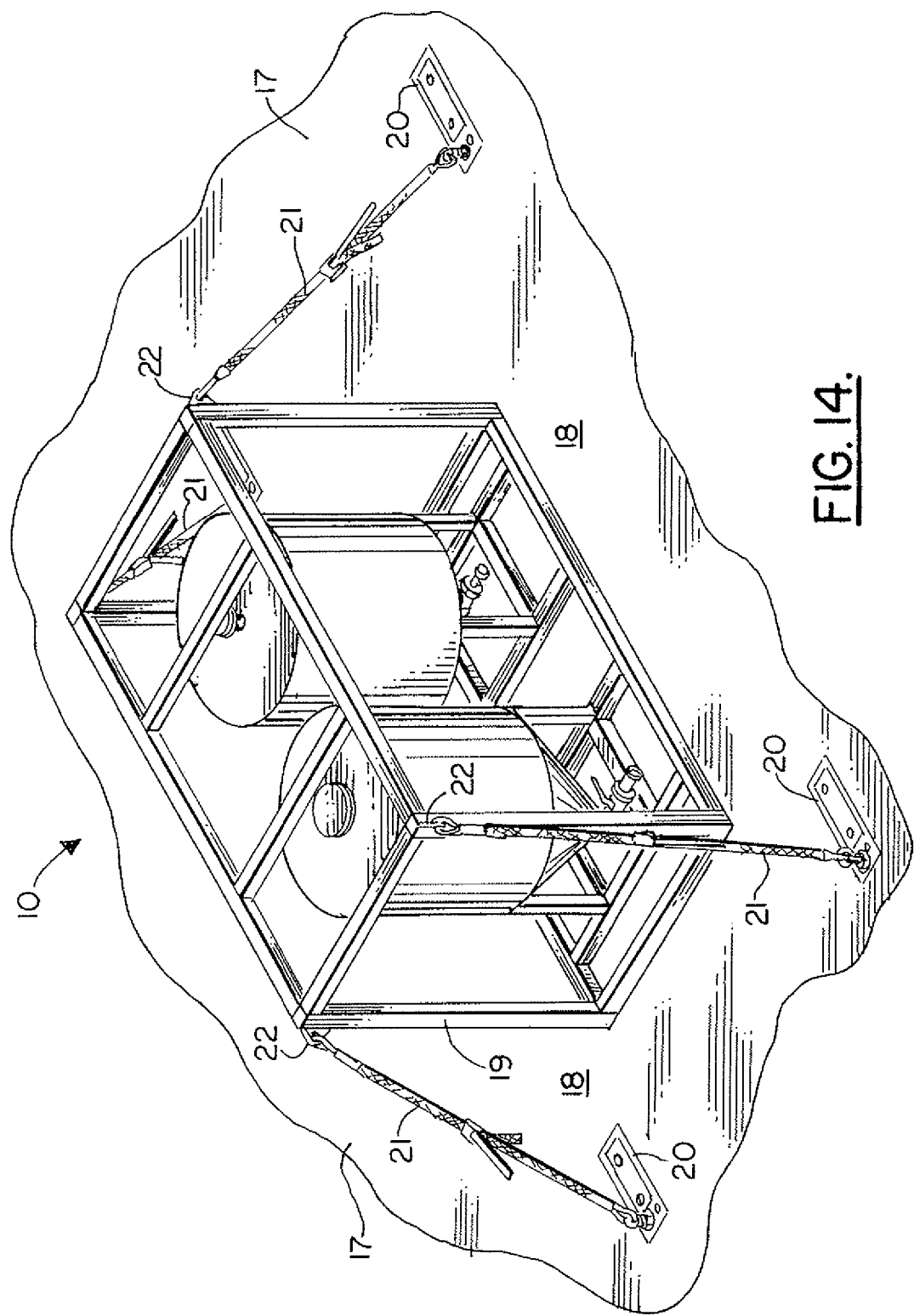
FIG. 14 is another perspective view of the preferred embodiment of the apparatus of the present invention.

FIGS. 13 and 14 show generally the preferred embodiment of the apparatus of the present invention designated generally by the numeral 10. Anchor apparatus 10 is shown in FIG. 13 in an exemplary environment, being used on a heliport 11 having a deck 12. Deck 12 can include a covering of deck plate 13 or the like, such as steel or other metal plate welded to a supporting beam network undersupport.

In FIG. 13, a craft (e.g. helicopter) 14 is shown resting upon the deck 12, secured by a plurality of tie down straps 15. The straps 15 are known in the art. The straps 15 can be configured to connect to the blades 16 of the helicopter 14 as shown in FIG. 13. Each strap 15 spans between a blade 16 and a fixture 20.

Another exemplary environment is shown in FIG. 14 wherein a platform deck 17 has an upper surface that can be comprised of sections of deck plate 18 such as metal deck plate. An equipment package 19 rests upon the platform deck 17 as shown. The equipment package 19 can include a structural frame and a number of different pieces of equipment or vessels or a combination of equipment and vessel(s). In FIG. 14, a plurality of tie down straps 21, slings or suitable rigging are attached to the package 19 at padeyes 22, each strap 21 spanning between a padeye 22 and a fixture 20. Deck 12, 17 could be any other type of deck such as a marine vessel deck, motor vehicle deck, etc.

Figure 8:
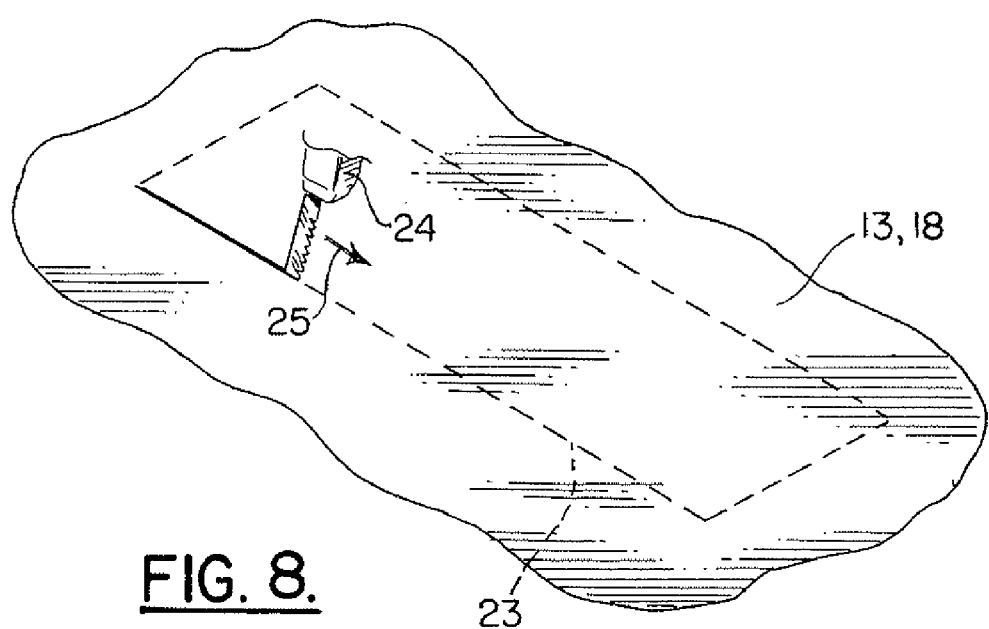
FIGS. 8-11 are schematic sequential perspective views illustrating installation of the fixture part of the preferred embodiment of the apparatus of the present invention.
Figure 9:
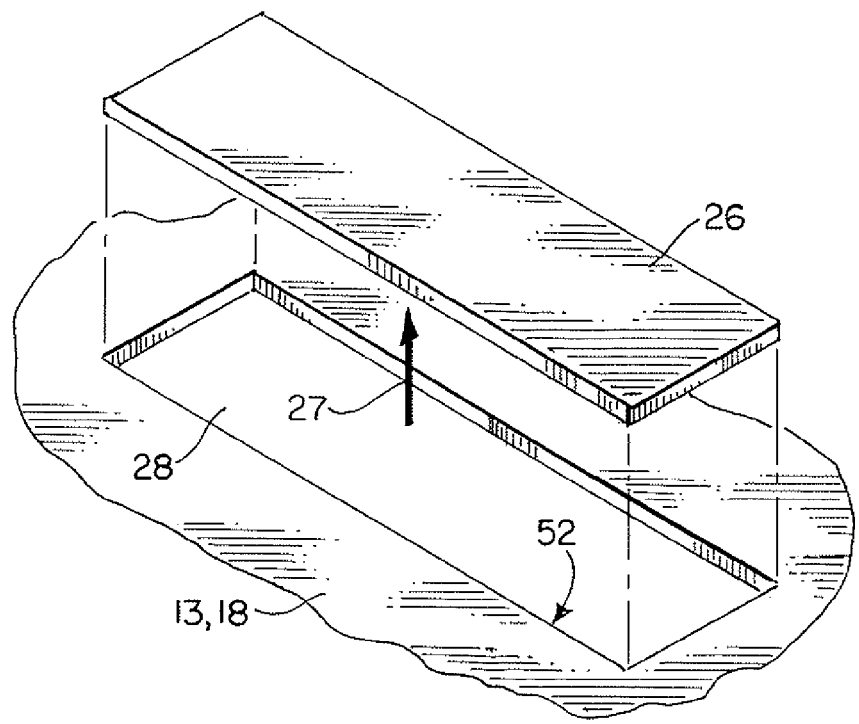

FIGS. 8, 9, 10 and 11 illustrate installation of a frame 30 that carries an anchor 40 in a concealed position below a selected deck 12, 17. Anchor 40 can be an anchor such as is shown and described in U.S. patent application Ser. No. 10/071,786 filed Feb. 7, 2002 and hereby incorporated herein by reference, now U.S. Pat. No. 7,077,610. In FIG. 8, reference line 23 (dotted line) is indicating a path for a cutting blade 24 or other cutter that moves in the direction of arrow 25. Cutter 24 forms an opening 28 in the deck plate 13 or 18. After the cut is completed, a removed section 26 is shown (indicated schematically by the arrow 27) being removed to leave an opening 28 in deck plating 13, 18.

Figure 10:
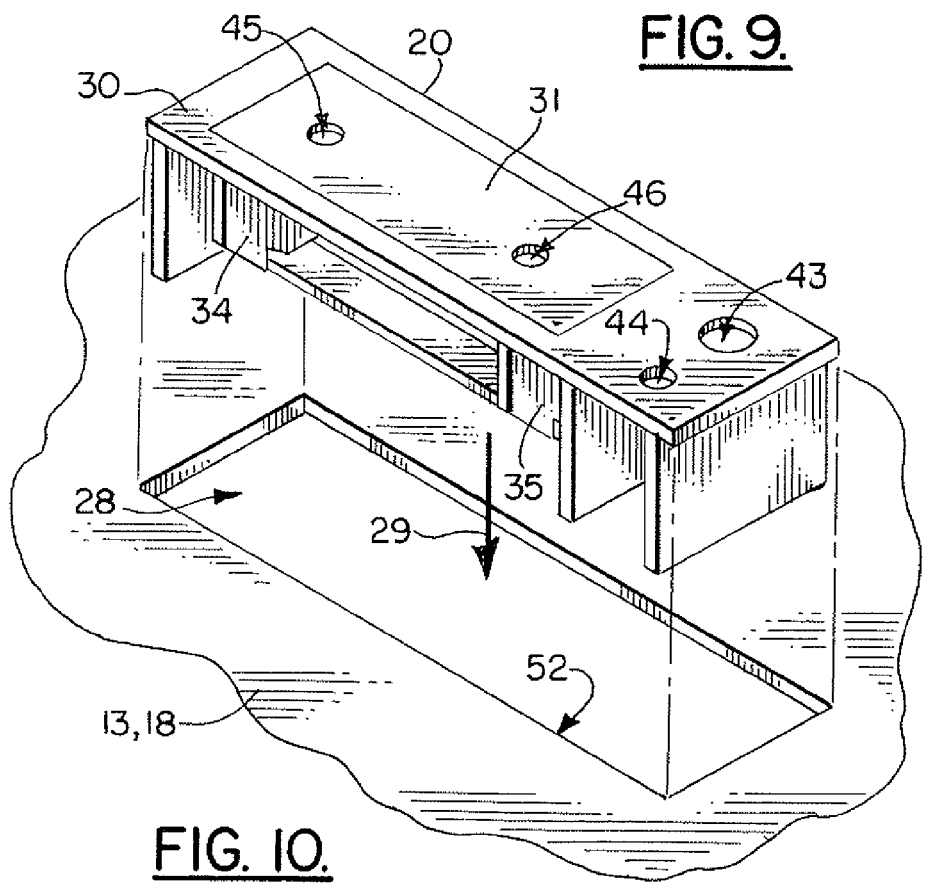
Figure 11:
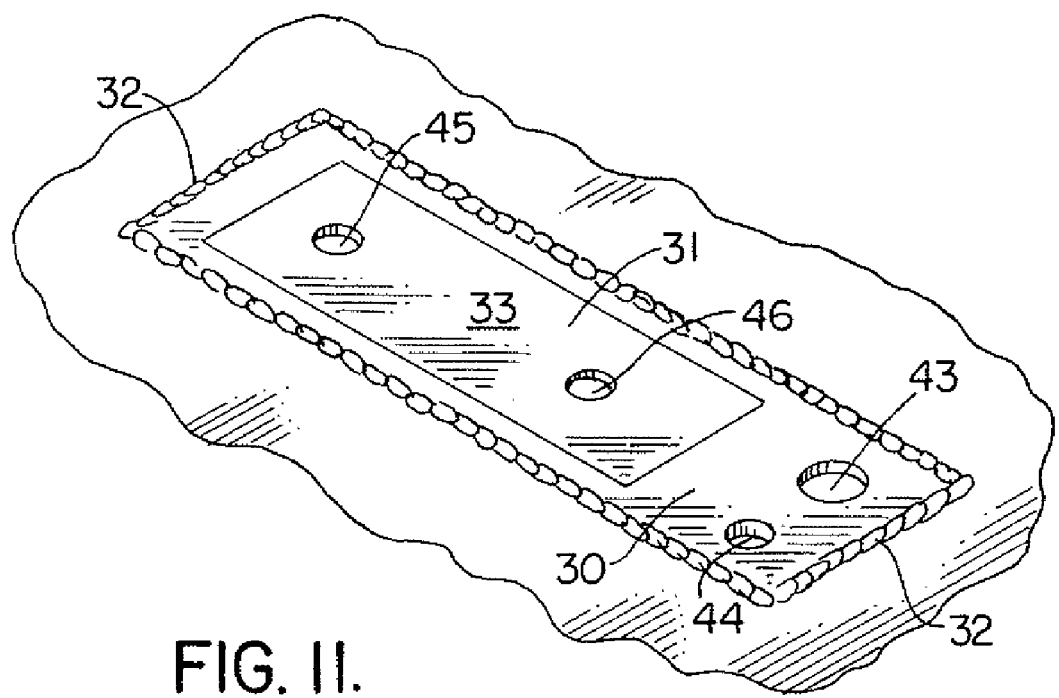

In FIG. 10, frame 30 is shown being placed into opening 28 as indicated schematically by arrow 29. Frame 30 is part of an overall fixture 20 that includes frame 30, hatch 31 and anchor 40. A weld 32 can be used to secure frame 30 in opening 28.

Figure 4:
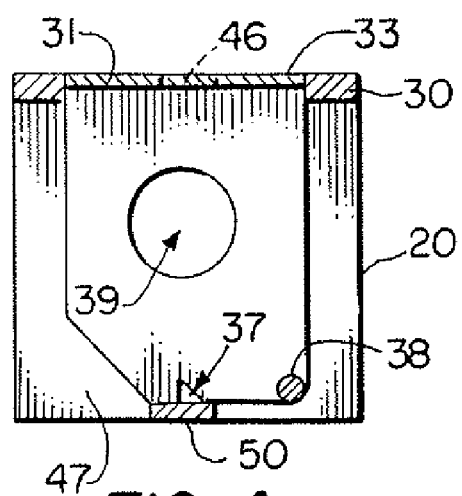
FIG. 4 is a sectional view taken along lines 4-4 of FIG. 2.
Figure 5:
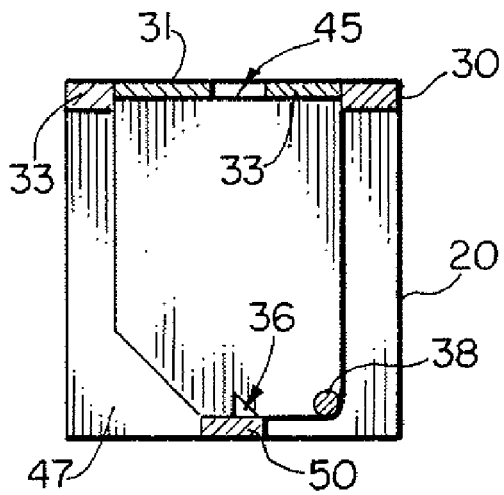
FIG. 5 is a sectional view taken along lines 5-5 of FIG. 2.
Figure 6:
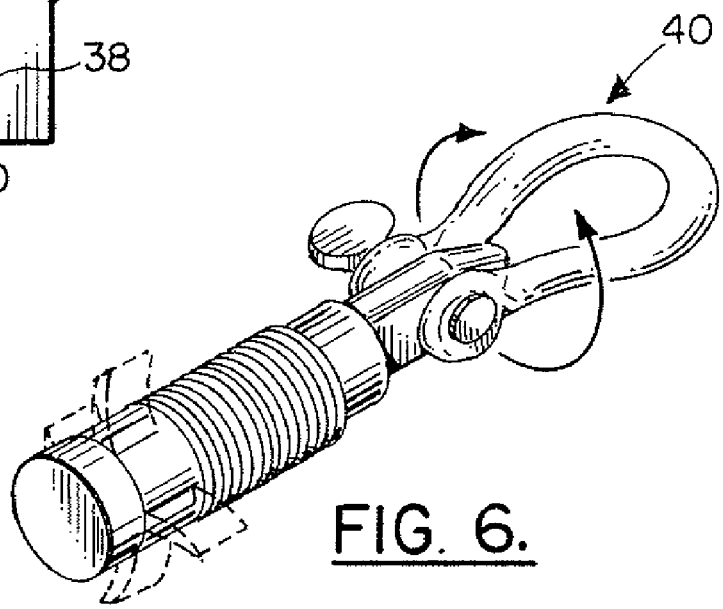
FIG. 6 is a partial perspective view of the preferred embodiment of the apparatus of the present invention.
Figure 7:
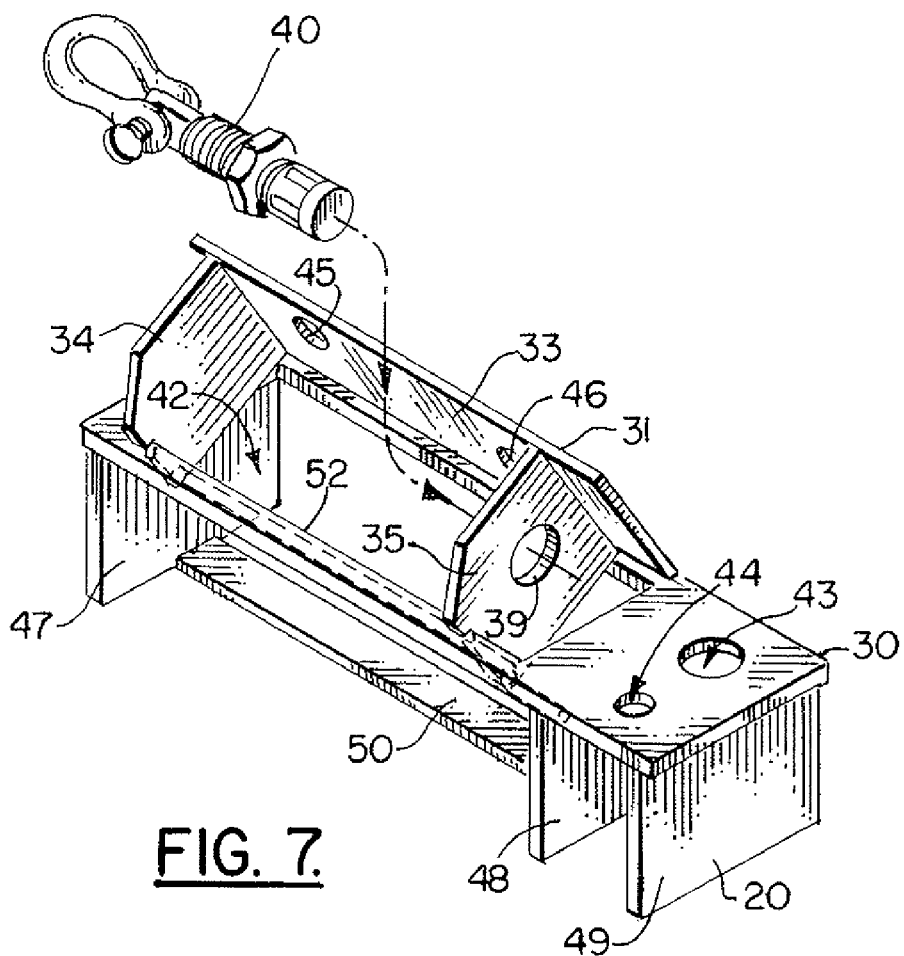
FIG. 7 is a perspective view of the preferred embodiment of the apparatus of the present invention.

Hatch 31 includes an upper plate 33 to which is attached lower plates 34, 35. In the preferred embodiment, the lower plates 34, 35 can form an angle of about 90 degrees with the upper plate 33. Each of the lower plates 34, 35 is provided with a notch 36, 37 respectively. Rod 38 connects plates 34, 35 together at a lower end portion of the plates 34, 35 as shown in FIGS. 4 and 5.

An opening 39 is provided in plate 35 for receiving anchor 40. The anchor 40 can be bolted to the opening 39 as shown in FIG. 12 for storage.

Figure 1:
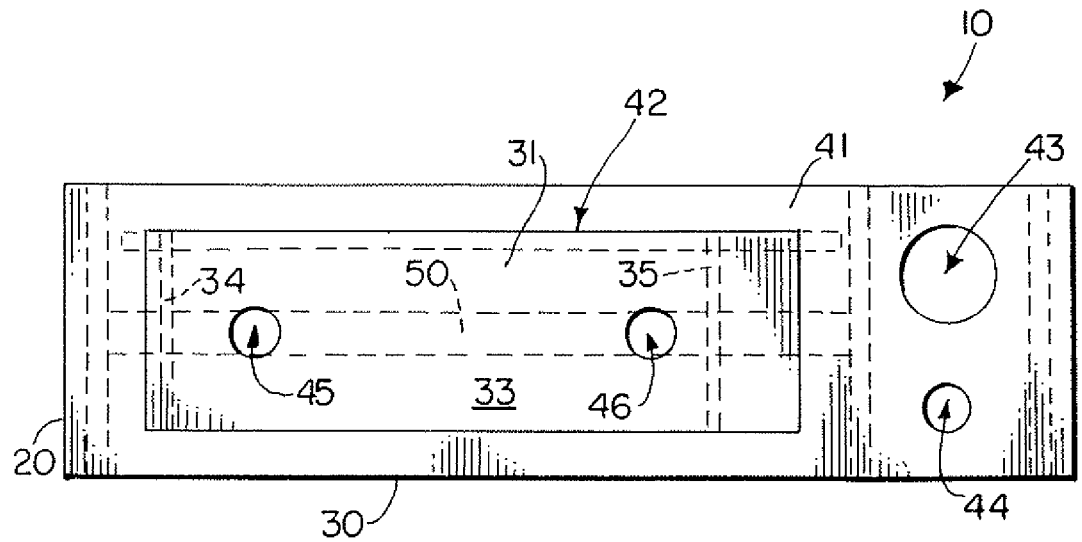
FIG. 1 is a partial plan view of the preferred embodiment of the apparatus of the present invention.
Figure 2:
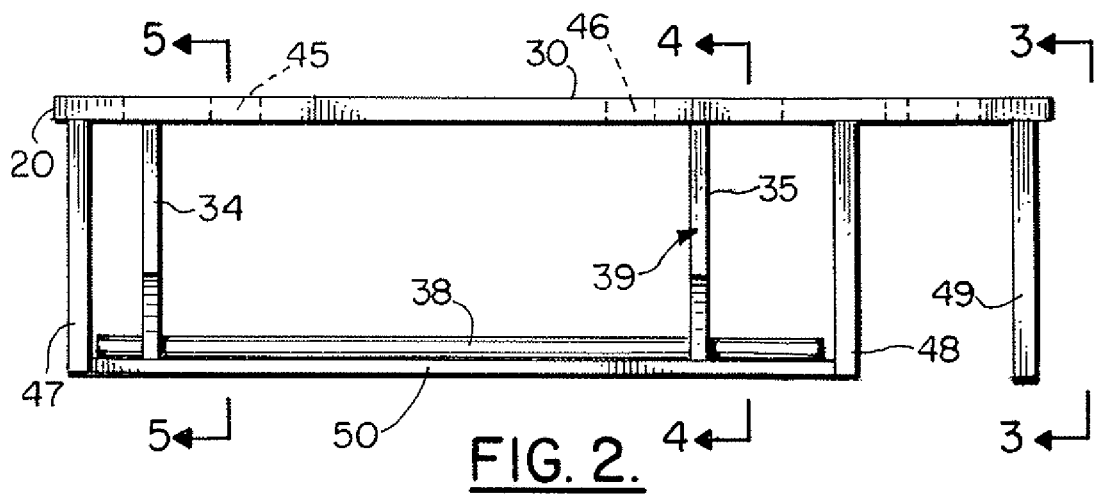
FIG. 2 is a partial elevation view of the preferred embodiment of the apparatus of the present invention.
Figure 3:
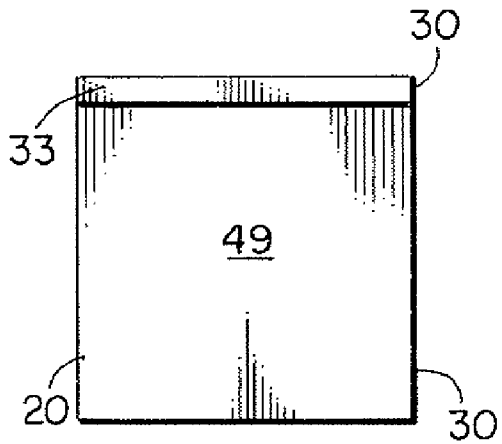
FIG. 3 is an end view taken along line 3-3 of FIG. 2.

Frame 30 is comprised of an upper plate 41 having a central, generally rectangular opening 42 that is receptive of hatch 31. Frame 30 upper plate 41 has a pair of circular openings including a larger diameter opening 43 and a smaller diameter opening 44. These openings 43, 44 are receptive of an anchor 40. Differing diameters of openings 43, 44 accommodate anchors 40 of differing diameters. Hatch 31 has openings 45, 46. Frame 30 provides lower plates 47, 48, 49 that are attached (for example welded) to upper plate 41 as shown in FIGS. 1 and 2. Transverse plate 50 is attached (for example, welded) to lower plates 47 and 48 opposite upper plate 41 as shown in FIGS. 2, 4, 5 and 7.

Figure 12:
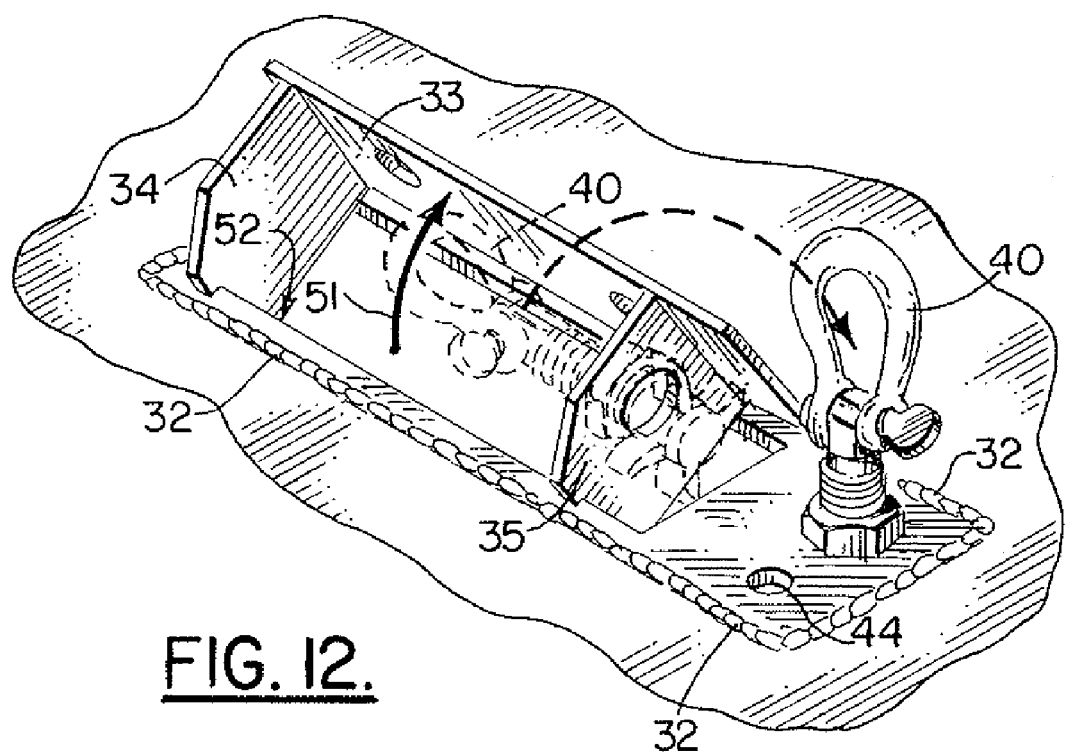
FIG. 12 is a partial perspective view of the preferred embodiment of the apparatus of the present invention.

In order to open hatch 31, a user grips either of the openings 45, 46 or both of the openings 45, 46 and lifts upwardly, rotating upper plate 41 in the direction of curved arrow 51 in FIG. 12. In order to hold the hatch 31 in an open position as shown in FIG. 12, the notches 37, 38 register with edge 52 as shown in FIG. 12. In this position, anchor 40 can be either removed from or attached to plate 35 at opening 39, depending upon whether anchor 40 is to be used or stored.

The following is a list of parts and materials suitable for use in the present invention.

PARTS LIST

| Part Number | Description |
|---|---|
| 10 | anchor apparatus |
| 11 | heliport |
| 12 | deck |
| 13 | deck plate |
| 14 | craft |
| 15 | tie down strap |
| 16 | blade |
| 17 | platform deck |
| 18 | deck plate |
| 19 | package |
| 20 | fixture |
| 21 | tie down strap |
| 22 | padeye |
| 23 | reference line |
| 24 | cutter |
| 25 | arrow |
| 26 | removed section |
| 27 | arrow |
| 28 | opening |
| 29 | arrow |
| 30 | frame |
| 31 | hatch |
| 32 | weld |
| 33 | upper plate |
| 34 | lower plate |
| 35 | lower plate |
| 36 | notch |
| 37 | notch |
| 38 | rod |
| 39 | opening |
| 40 | anchor |
| 41 | upper plate |
| 42 | opening |
| 43 | larger opening |
| 44 | smaller opening |
| 45 | opening |
| 46 | opening |
| 47 | lower plate |
| 48 | lower plate |
| 49 | lower plate |

-continued

PARTS LIST

| Part Number | Description |
|---|---|
| 50 | transverse plate |
| 51 | curved arrow |
| 52 | edge |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A below deck, concealable anchor apparatus, comprising:
   a) a deck having an upper surface defined by a deck plate;
   b) a deck opening;
   c) a fixture attached to the deck plate at the opening and including a static frame and a movable hatch;
   d) the frame having an upper plate portion that is substantially flush with the deck plate and an underdeck structure that extends downwardly from the upper plate;
   e) the movable hatch having an upper plate and a container below the upper plate with an interior space for holding an anchor; and
   f) an anchor having a part that is receptive of a tie down strap and a connector for forming selective attachments with the frame upper plate or with the hatch.

2. The anchor apparatus of claim 1 wherein the anchor is an eyebolt.

3. The anchor apparatus of claim 1 wherein the deck opening is rectangular in shape.

4. The anchor apparatus of claim 1 wherein the container includes at least one lower plate attached to the upper plate and wherein the anchor is removably attachable to the lower plate.

5. The anchor apparatus of claim 4 wherein there are a pair of lower plates.

6. The anchor apparatus of claim 5 wherein the lower plates are spaced apart.

7. The anchor apparatus of claim 6 wherein the lower plates are parallel.

8. The anchor apparatus of claim 7 further comprising a transverse plate that connects between the lower plates and that is generally parallel to the upper plate.

9. The anchor apparatus of claim 5 wherein at least one of the lower plates has a projecting portion that enables the lower plate to attach to the static frame defining an open position of the movable hatch relative to the static frame.

10. The anchor apparatus of claim 9 wherein the hatch has at least one hatch opening.

11. The anchor apparatus of claim 4 wherein the lower plate has a lower plate opening and the anchor is removably attachable to the lower plate.

12. The anchor apparatus of claim 4 wherein the lower plate is generally perpendicular to the upper plate.

13. The anchor apparatus of claim 1 wherein the static frame includes a static plate welded to the deck plate at the deck opening.

14. The anchor apparatus of claim 13 wherein the static plate has at least one opening.

15. The anchor apparatus of claim 14 wherein the anchor is configured to removably attach to the static plate at the opening.

16. The anchor apparatus of claim 15 wherein the lower plate has a lower plate opening and the anchor is removably attachable to the lower plate.

17. The anchor apparatus of claim 16 wherein the static plate opening and the lower plate opening are about the same diameter and the anchor is removably attachable to either of the lower plate opening or static plate opening.

18. The anchor apparatus of claim 1 wherein the anchor is an externally threaded member.

19. The anchor apparatus of claim 18 wherein the fixture is apertured and the anchor has a nut removably attachable thereto for enabling a bolted connection to be formed between the anchor and the fixture.

20. The anchor apparatus of claim 19 wherein the fixture has multiple openings, at least one on the static frame and at least one on the movable hatch.

21. The anchor apparatus of claim 1 wherein the movable hatch moves between elevated and lowered positions.

22. The anchor apparatus of claim 21 wherein the movable hatch forms an acute angle with the deck plate when the hatch is in the elevated position.

23. The anchor apparatus of claim 21 wherein the movable hatch rotates when moving between the elevated and the lowered positions.

24. The anchor apparatus of claim 1 wherein the anchor is selectively attachable to the movable hatch at a position below the upper plate.

25. The anchor apparatus of claim 24 wherein the anchor is selectively attachable to the movable hatch at a position that places the anchor within the movable hatch interior space.

26. The anchor apparatus of claim 1 wherein the movable hatch has a downwardly extending plate attached to the hatch upper plate and the anchor is selectively attachable to the movable hatch downwardly extending plate.

\* \* \* \* \*